(12) United States Patent
Wood et al.

(10) Patent No.: US 7,842,354 B2
(45) Date of Patent: *Nov. 30, 2010

(54) ELASTOMERIC COMPOUND

(75) Inventors: Douglas Bruce Wood, Lincoln, NE (US); Thomas George Burrowes, N. Canton, OH (US)

(73) Assignee: Veyance Technologies, Inc., Fairlawn, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/797,684

(22) Filed: Jun. 10, 2010

(65) Prior Publication Data

US 2010/0247787 A1 Sep. 30, 2010

Related U.S. Application Data

(62) Division of application No. 12/706,158, filed on Feb. 16, 2010, now Pat. No. 7,759,427, which is a division of application No. 11/154,776, filed on Jun. 16, 2005, now Pat. No. 7,683,136.

(51) Int. Cl.
*B29C 71/02* (2006.01)
*B05D 3/02* (2006.01)

(52) U.S. Cl. .................. 427/542; 427/372.2; 427/385.5; 427/389.9; 427/393.5

(58) Field of Classification Search .................. 427/542, 427/372.2, 385.5, 389.9, 393.5
See application file for complete search history.

(56) References Cited

U.S. PATENT DOCUMENTS

| | | | |
|---|---|---|---|
| 2,582,366 A | 1/1952 | White | 74/233 |
| 2,683,141 A | 7/1954 | Erchak, Jr. | 260/94.9 |
| 3,060,163 A | 10/1962 | Erchak, Jr. | 260/94.9 |
| 3,418,186 A | 12/1968 | Wetzel | 156/140 |
| 3,897,291 A | 7/1975 | Hoback et al. | 156/138 |
| 4,027,543 A | 6/1977 | Johnston | 74/231 R |
| 4,128,253 A | 12/1978 | Powers | 280/79.1 A |
| 4,283,455 A | 8/1981 | McGee | 428/240 |
| 4,506,056 A | 3/1985 | Gaylord | 524/445 |
| 4,774,277 A | 9/1988 | Janac et al. | 524/474 |
| 4,990,568 A | 2/1991 | Benefield et al. | 525/232 |
| 5,177,143 A | 1/1993 | Chang et al. | 524/848 |
| 5,209,705 A | 5/1993 | Gregg | 474/204 |
| 5,216,074 A | 6/1993 | Imai et al. | 525/66 |
| 5,231,159 A | 7/1993 | Patterson et al. | 528/53 |
| 5,238,731 A | 8/1993 | Blanch et al. | 428/266 |
| 5,358,693 A | 10/1994 | Brinkmann et al. | 422/137 |
| 5,421,789 A | 6/1995 | Gregg | 474/153 |
| 5,610,217 A | 3/1997 | Yarnell et al. | 524/397 |
| 5,905,106 A | 5/1999 | Prigent et al. | 524/430 |
| 6,153,704 A | 11/2000 | Kodama et al. | 525/240 |
| 6,251,977 B1 | 6/2001 | Georget et al. | 524/397 |
| 6,291,374 B1 | 9/2001 | Landi | 442/237 |
| 6,453,960 B1 | 9/2002 | Kondo et al. | 152/451 |
| 6,491,598 B1 | 12/2002 | Rosenboom | 474/260 |
| 6,491,992 B1 | 12/2002 | Koizumi et al. | 428/34 |
| 6,561,937 B1 | 5/2003 | Wegele | 474/263 |
| 6,610,768 B1 | 8/2003 | Jelenic et al. | 524/386 |
| 6,616,558 B2 | 9/2003 | South | 474/260 |
| 6,695,734 B2 | 2/2004 | Hedberg et al. | 474/263 |
| 6,764,422 B2 | 7/2004 | Hasaka et al. | 474/263 |
| 6,942,590 B2 | 9/2005 | Okuno et al. | 474/242 |
| 7,235,028 B2 | 6/2007 | Martin et al. | 474/264 |
| 7,258,639 B2 | 8/2007 | Tachibana et al. | 474/237 |
| 7,485,060 B2 | 2/2009 | Hineno et al. | 474/263 |
| 2002/0042317 A1 | 4/2002 | South | 474/264 |
| 2002/0187869 A1 | 12/2002 | Martin et al. | 474/260 |
| 2005/0288439 A1 | 12/2005 | Pazur et al. | 525/191 |
| 2006/0100377 A1 | 5/2006 | Ouhadi | 525/191 |
| 2006/0148990 A1 | 7/2006 | Burrowes et al. | 525/192 |
| 2010/0196612 A1* | 8/2010 | Wood et al. | 427/389.9 |

FOREIGN PATENT DOCUMENTS

| | | |
|---|---|---|
| EP | 0537462 | 9/1992 |
| EP | 0712891 | 5/1996 |
| EP | 1052425 | 11/2000 |
| EP | 1057865 | 12/2000 |
| EP | 1108750 | 12/2000 |
| EP | 1081180 | 3/2001 |

* cited by examiner

*Primary Examiner*—Nathan M Nutter
(74) *Attorney, Agent, or Firm*—Alvin T. Rockhill; Kathleen K. Bowen

(57) ABSTRACT

The subject invention reveals a method for preparing a coated fabric which comprises (I) applying a vulcanizable elastomer composition to a layer of fabric, wherein the vulcanizable elastomer composition is made by: (1) mixing a cross-linkable functionalized polyethylene with at least one cross-linkable liquid elastomer to form a non-reactive extrudant, wherein the mixing occurs at a temperature in the range of 10° F. above or below the melt point of the cross-linkable functionalized polyethylene, and wherein the non-reactive extrudant contains from 20 to 80 pph of the cross-linkable liquid elastomer, (2) extruding the non-reactive extrudant, and (3) mixing the extrudent with at least one curing agent, wherein the mixing is sufficient to form the vulcanizable elastomer which has a complex dynamic viscosity of less than 5 McP (5,000 N*s/m2) for at least 2 minutes at a maximum flow temperature; and (II) heating the layer of fabric having the vulcanizable elastomer applied thereto to a temperature which is within the range of 200° F. to 310° F. for at least 2 minutes to produce the coated fabric.

20 Claims, 5 Drawing Sheets

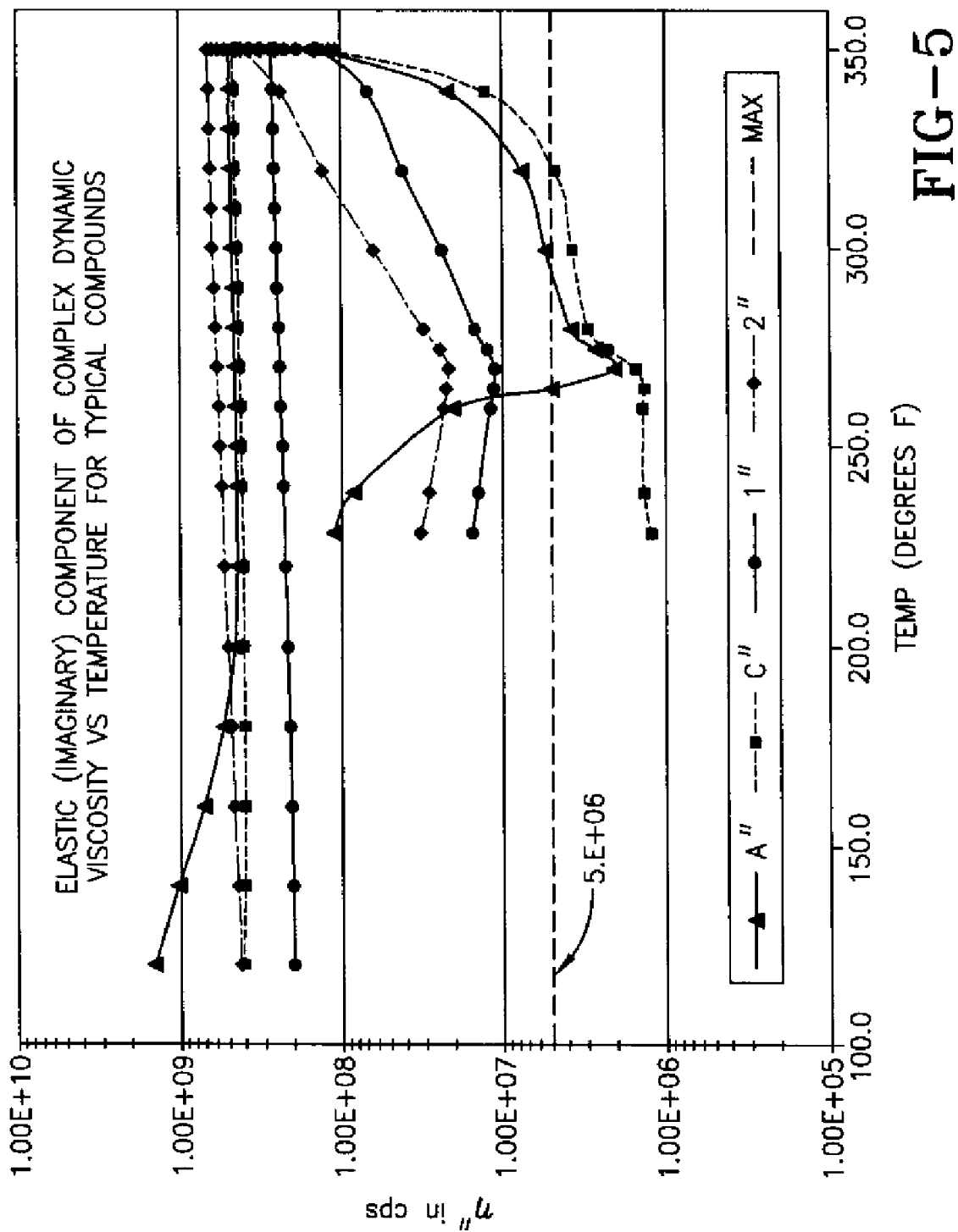

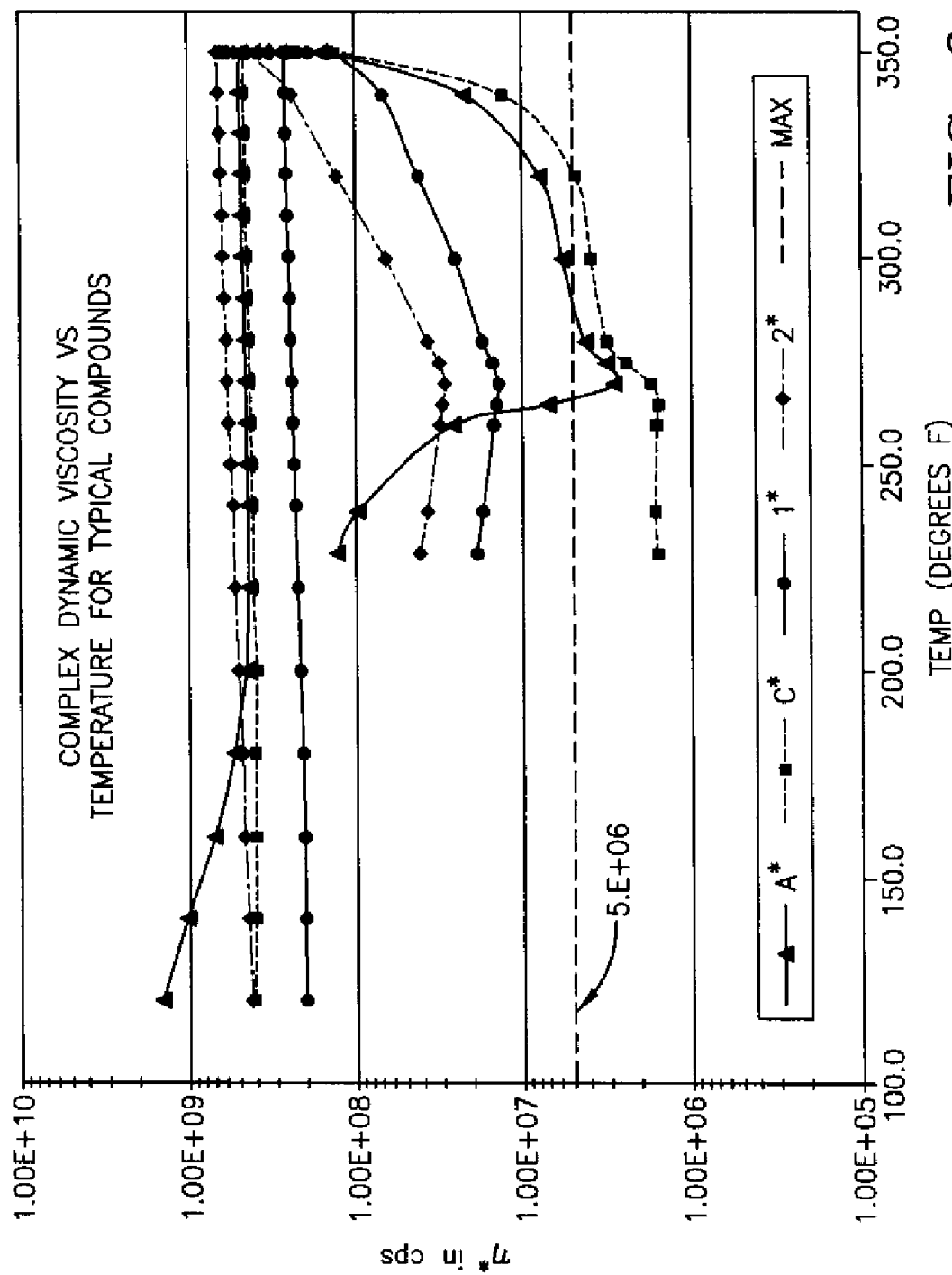

ELASTOMERIC COMPOUND

This is a divisional of U.S. patent application Ser. No. 12/706,158, filed on Feb. 16, 2010, now issued as U.S. Pat. No. 7,759,427 which is a divisional of U.S. patent application Ser. No. 11/154,776, filed on Jun. 16, 2005, now issued as U.S. Pat. No. 7,683,136. The teachings of U.S. patent application Ser. No. 11/154,776 and U.S. patent application Ser. No. 12/706,158 are incorporated herein by reference in their entirety.

FIELD OF THE INVENTION

The present invention is directed to an elastomeric compound and a method of preparing the compound. Specifically, the present invention is directed to an elastomeric compound comprising a liquid elastomer that is particularly useful for treating a cord or fabric that will be embedded in or attached to the surface of an elastomeric product wherein the encapsulation of the fabric or cord within the product is improved.

BACKGROUND OF THE INVENTION

In manufacturing reinforced elastomeric products, it is essential that the reinforcing means adhere to the elastomer. This is conventionally accomplished by first treating the cord or the fabric with an adhesive, such as an RFL. The material may then be subjected to a topcoating, and eventually the cord or fabric is embedded in elastomer.

U.S. Pat. No. 6,764,422 (Hasaka et al) discloses a number of methods of treating a fabric. The disclosed methods include various combinations of pretreating with an epoxy compound, adhesion treating with RFL consisting of an elastomer latex, and overcoat treating with a rubber adhesive prepared by dissolving a rubber in a solvent. While this produces a cord that bonds well, the adhesion treating and the overcoat treating use either latex or a solvent. When using such treatments, the liquid in the latex solution or the solvent must be evaporated or otherwise removed, creating an additional step in the fabric processing and requiring additional machinery to remove and handle the removed liquid or solvent.

The viscoelasticity of useful elastomers is somewhat reduced by heat and shear generated by calendering, but not to the same extent achieved by solvation. The calender can apply the elastomer at higher pressure and the softening elastomer can penetrate the larger interstices near the surface of the fabric or cord but not the smaller interstices of the fabric or cord. Even when softened, the unvulcanized elastomer has a significant elastic component of the viscoelasticity that reduces penetration of small cavities.

The encapsulating material on the outer surface of fabric on the surface of the elastomeric product may also need to have properties of oil resistance, wear resistance, ozone & heat resistance, coefficient of friction, depending on the function of the reinforced article.

SUMMARY OF THE INVENTION

The present invention is directed to an elastomeric compound comprising a liquid elastomer. The liquid elastomer imparts a desired complex dynamic viscosity property to the elastomeric compound that renders the elastomeric compound particularly suitable for treating fabrics and cords to ensure full encapsulation of the fabrics or cords.

Disclosed herein is an elastomeric compound, the elastomeric compound comprising a liquid elastomer. The elastomeric material, prior to cure, has a complex dynamic viscosity of less than 5 McP (5,000 N*s/m$^2$) for at least 2 minutes at a maximum flow temperature $T_F$. The liquid elastomer has a complex dynamic viscosity less than 5 McP (5,000 N*s/m$^2$) at a temperature between 20° C. and the maximum flow temperature $T_F$ and is present in the elastomeric compound in amounts of 20-80 parts per hundred cross-linkable material (phcm), preferably 25-60 phcm. Additionally, the elastomeric compound may have 2-15 parts per hundred of cross-linkable material of peroxide.

In another aspect of the disclosed elastomeric compound, the liquid elastomer is selected from the group consisting of butadiene rubber, NBR, HNBR, SBR rubber, neoprene rubber, butyl rubber, polyisoprene rubber, propylene rubber, XNBR, or EP(D)M rubber.

Disclosed herein is a method of forming the elastomeric compound wherein the solid elastomer of the compound is fluxed into the liquid elastomer. This is done by mixing the at least one solid elastomer into the liquid elastomer at a temperature in the range of 10° F. (5.5° C.) above or below the melt point of the solid elastomer. The elastomers are mixed to form a non-productive that is then extruded. The extrudant is mixed with curing agents, and other elastomeric additives as necessary, to form a vulcanizable elastomer.

Disclosed herein is a method for treating fabric or cords for use in a reinforced elastomeric article using the elastomeric compound. The reinforced article may be a hose, belt, tire, air spring sleeve, or other article. After the mix of solid and liquid elastomers is mixed to form a vulcanizable elastomer, the material is applied to a fabric or cords. The coated fabric or cords is heated to a temperature of 200° F.-310° F. (93° C.-154° C.) for at least two minutes wherein the elastomer fully penetrates the fabric or fully encapsulates the cords. This heating may occur prior to forming the uncured reinforced article or may occur in a mold or autoclave prior to curing the article.

Additionally, the fabric or cords may be pretreated with an adhesive. When coating fabrics, the treated fabric may comprise more than one layer of fabric. The fabric may be woven, knitted, needled, matted, or comprises a plurality of individual cords and nominal weft threads maintaining a spacing of the individual cords.

Disclosed herein is a power transmission product employing at least one cord or fabric layer, the cord or fabric layer being impregnated with the elastomeric compound comprising 20-80 phcm of a liquid elastomer. The cord or fabric layer may form at least one surface layer of the power transmission belt. The belt may be a v-belt, a poly-v belt, a synchronous drive belt, or any other type of conventional belt.

BRIEF DESCRIPTION OF THE DRAWINGS

The invention will be described by way of example and with reference to the accompanying drawings in which:

FIGS. 4-6 show dynamic viscosity properties of different compounds.

DETAILED DESCRIPTION OF THE INVENTION

Figure 1:
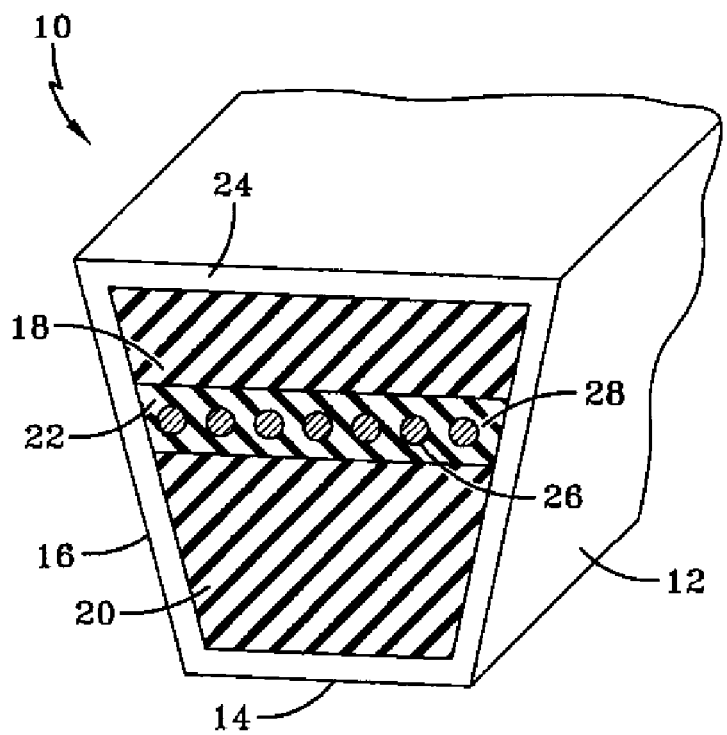
FIG. 1 is a v-belt.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

A typical v-belt 10 is illustrated in FIG. 1. The belt 10 is particularly adapted to be used in associated sheaves in accordance with techniques known in the art. The belt is adapted to be used in so-called torque sensing drives, applications where shock loads of varying belt tension are imposed on the belt, applications where the belt is operated at variable speeds, applications where the belt is spring-loaded to control its tension, and the like.

The belt 10 has at least one drive surface. In the illustrated belt, there are three drive surfaces 12, 14, 16. The belt 10 comprises a tension section 18, a cushion section 20, and a load-carrying section 22 disposed between the tension section 18 and the cushion section 20.

The belt 10 may also be wrapped or provided with a fabric layer 24 on all sides. The fabric layer 24 may be made from a bi-directional, non-woven, woven, or knitted fabric. Each fabric layer 24 is coated with an elastomeric material selected to assure the layer 24 is bonded to its associated belt section 18, 20, 22. The fabrics for use in the belt 10 are made of conventional materials including nylon (such as nylon 4,6, nylon 6, 6, and nylon 6), cotton, polyester, cotton/polyester, nylon/polyester, cotton/nylon, Lycra™ (segmented polyurethane), aramid, rayon, and the like. Preferably, the fabric is made of cotton/polyester.

The load-carrying section 22 has load-carrying means 26 in the form of load-carrying cords or filaments which are suitably embedded in an elastomeric cushion or matrix 28 in accordance with techniques which are well known in the art. The cords or filaments may be made of any suitable material known and used in the art. Representative examples of such materials include aramids, fiberglass, nylon, polyester, cotton, steel, carbon fiber and polybenzoxazole.

The rubber compositions for use in the tension section 18 and cushion section 20 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrile butadiene elastomers, styrene-butadiene rubbers, polybutadiene, EPM, EPDM, hydrogenated acrylonitrile-butadiene copolymers (HNBR), polyurethane, CPE, elastomers marketed under the Viton™ designation and ethylene-acrylic elastomers sold under the name VAMAC and blends thereof. The matrix 28 may also be the same composition used for the tension or cushion sections 18, 20.

Figure 2:
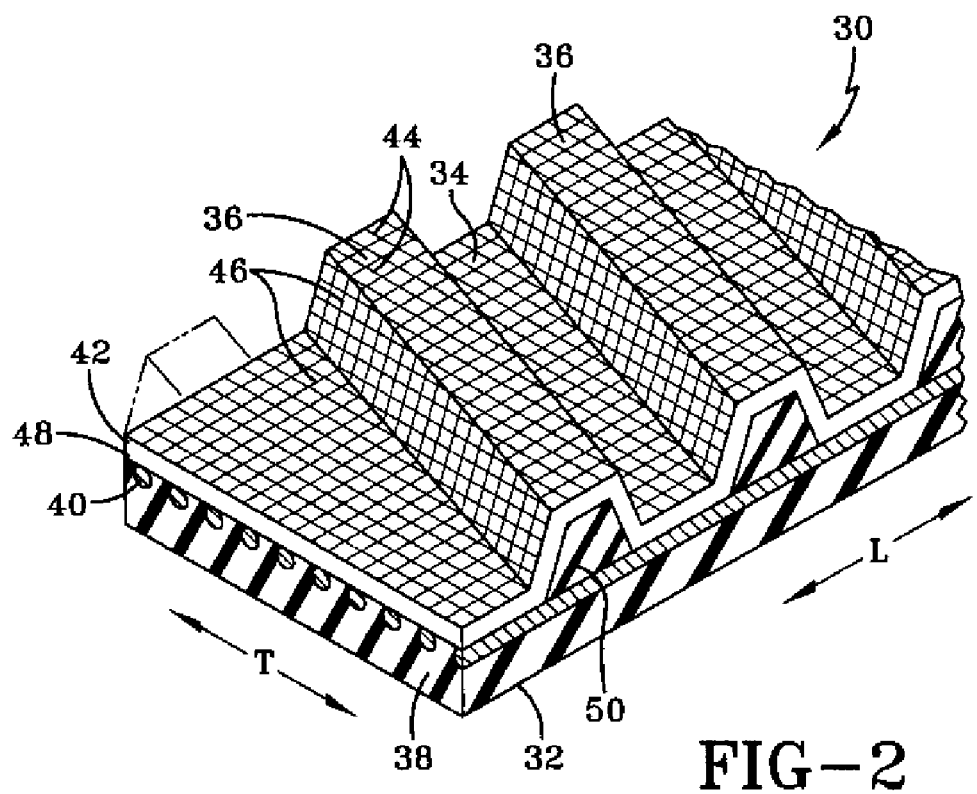
FIG. 2 is a toothed transmission belt.

The drive surfaces 12, 14, 16 of the belt 10 of FIG. 1 are smooth. In accordance with other embodiments and as discussed later, it is contemplated herein the belts of the present invention also include those belts where the drive surface of the belt may be single V-grooved, multi-V-grooved and synchronous wherein an inner toothed surface that engages with tooth spaces on the periphery of a mating sprocket. Representative examples of synchronous belts include belts having trapezoidal or curvilinear teeth. The tooth design may be perpendicular to the belt, or have a helical offset tooth design such as shown in U.S. Pat. No. 5,209,705 and U.S. Pat. No. 5,421,789. A toothed belt 30 is illustrated in FIG. 2.

The belt 30 has a belt body with an outer surface 32 and an inner facing toothed surface 34. The inner facing surface 34 has at least one row of adjacent rows of teeth 36. The belt body 38 is made of a resilient elastomer and preferably reinforced with longitudinal tensile members 40 that lie along the belt longitudinal direction L. The outer surface 32 of the belt may also be formed with teeth, forming a dual sided belting. The inner toothed surface is reinforced with an abrasion resistance fabric 42. The illustrated fabric 42 is defined by warp and weft yarns. The warp yarns 44 extend in the transverse direction T while the weft yarns 46 extend in the longitudinal direction L. Alternatively, the fabric may have the warp and weft yarns inclined at other angles, i.e. a bias cut fabric, or the fabric may be a knit.

As noted above, to effectively adhere the fabric layer 24, 42 to the body of the belt, the fabric layer is coated with an elastomer composition. The outer surface of the fabric may also be coated to achieve resistance to oil, ozone, and abrasive wear and to control the coefficient of friction. An elastomer may also be forced into voids of the fabric to encapsulate the individual fibers or fiber bundles to reduce internal wear that occurs when fibers move or flex while in contact with adjacent fibers.

High stress cycling of EP or EPDM elastomers in contact with a metal surface can result in softening and transfer of the softened material from the body of the elastomer to the metal surface. In the context of power transmission products, such as the belts discussed above, this undesirable process is called piling. Since the fabric coating elastomeric composition, after vulcanizing of the belt, forms all or part of the driving surface of the belt, reduced pilling of the belt surface is desired. One way to achieve a reduced pilling of the belt surface for belts made of EP or EPDM elastomers is to have a high ethylene content of the elastomeric composition, preferably greater than 65%. To achieve this high ethylene content, a suitable base cross-linkable material is EPDM. However, EP(D)M compounds with relatively high ethylene content can be difficult to process.

Increasing the ethylene content can also be achieved by the use of functionalized polyethylene. Unvulcanized, functionalized polyethylene is a brittle thermoplastic at room temperature, but exhibits a melt point below $T_F$ max. Two examples of base cross-linkable materials mixes for an elastomeric composition that result in a desired high ethylene content are set forth in Table 1 below.

TABLE 1

| Material | A | B |
|---|---|---|
| EP[1] | 25 | 21.5 |
| EPDM[2] | 25 | 21.5 |
| Polyethylene[3] | 50 | 57 | all amounts are provided in parts per hundred cross-linkable material (phcm)

[1]Trilene CP80, liquid EPM that has an Ethylene/Propylene ratio of 43/57 and has a Brookfield viscosity of 500,000 cps at 140° F. (60° C.), from Crompton Corp.
[2]Trilene 77, is a solid EPDM at room temperature that has an Ethylene/Propylene ratio of 75/25 with an ENB content of 10.5%, from Crompton Corp.
[3]A-C 307A, an oxidized polyethylene homopolymer, from Honeywell Specialty Chemicals, has a Brookfield viscosity of 85,000 cps at 302° F. (150° C.).

Both Examples A and B above use liquid elastomers as primary cross-linkable constituents in the compound. Liquid elastomers are known; however, such compounds are conventionally used not as a primary constituent in a compound but as a processing aid in conventional amounts of generally less than 10 parts per hundred rubber (phr) to assist in incorporation of additives in a solid elastomeric compound.

In accordance with the present invention, the fabric layer is treated with an elastomer composition wherein the cross-linkable material comprising the elastomer composition includes a liquid elastomer. The liquid elastomer is present in amounts of 20-80 phcm. Preferably, the liquid elastomer is present in amounts of 25-60 phcm. Most preferred is a liquid elastomer content of 30-55 phcm.

Cross-linkable material is herein defined as a material in a composition that chemically links with other material within the composition. For the purpose of this definition, co-agents and co-cures, such as peroxide, zinc methacrylate, zinc diacrylate, bis-maleimide, are not considered cross-linkable materials. Cross-linkable materials include conventional solid elastomers, liquid elastomers, and cross-linkable thermoplastic resins or waxes.

Liquid elastomer is herein defined as an elastomer that has complex dynamic viscosity less than 5,000,000 centipoise (5,000 N*s/m$^2$) at some temperature between 20° C. and the maximum flow temperature $T_F$ max for that material. $T_F$ max is herein defined as the maximum temperature at which the complex dynamic viscosity of the elastomer, when compounded for any useful purpose with vulcanizing materials and prior to vulcanization, remains less than 5,000,000 centipoise (5,000 N*s/m$^2$) for at least 2 minutes. The viscosity is measured by a Rubber Process Analyzer, Model No. 2000 by Monsanto Corporation of St. Louis, Mo., applying 0.5 degree strain at 60 cps, which results in 14% P-P sinusoidal strain and shear rate of 0.438 inverse seconds. The complex viscosity includes the elastic and viscous components of stress arising from the sinusoidally imposed strain, and includes the yield stress for elastomers exhibiting plastic or Bingham flow properties. Elastomers meeting this definition may appear to be liquid or solid at room temperature, but have a very low viscosity compared to elastomers which are defined by a Mooney viscosity at a flow temperature $T_F$ in the range of 200°-310° F. (93°-154° C.). The onset of vulcanization may be present at $T_F$ max, but practical vulcanization preferably begins at temperatures $T_V$ greater than 300° F. (149° C.).

Figure 4:
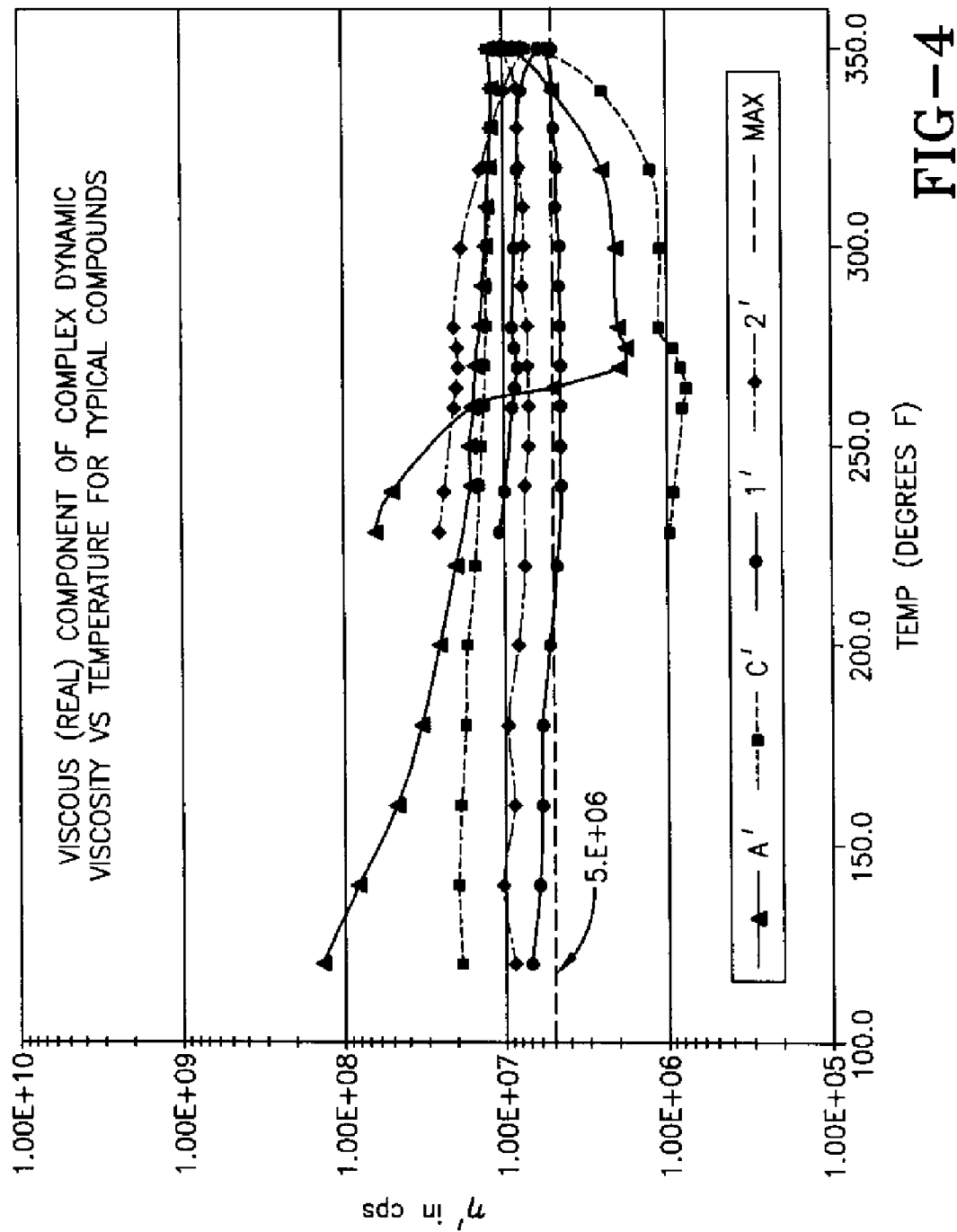

FIGS. 4-6 show the complex dynamic viscosity properties, specifically, the η', η", and η*, of different compounds, including several that comprise liquid elastomer per the present invention. In the charts, the compounds tested are as follows:

TABLE 2

| Compound | |
|---|---|
| 1 | low mooney solid EP |
| 2 | high mooney solid EPDM |
| A | Compound A from Table 1 |
| C | 50/50 phcm blend of liquid EPM and EPDM |

All of the compounds had similar carbon black loading and peroxide cure systems. For testing, samples were placed in the RPA-2000 in a biconical cavity that had been preheated to 220° F. and a sinusoidal strain of constant amplitude and frequency was applied as the temperature was changed. The temperature versus time profile was:

1. ramp from 220° F. to 350° F. in 6.5 minutes;
2. cure at 350° F. for 15 minutes; and
3. cool slowly from 350° F. to 120° F.

Each test was repeated 3 times and the results averaged to determine the compound properties. To read the charts of FIGS. 4-6 as a time-line, start at the 220° F. end of each line, follow the temperature increase to 350° F., and subsequent decrease to 120° F. The maximum viscosity for the $T_F$ max is indicated by the MAX line.

Compounds 1 and 2 show typical low and high mooney polymers with moderate carbon black loading. For the viscous component of the complex dynamic viscosity, η' is relatively constant prior to cure and begins to decrease with increasing temperature until vulcanization begins. After cure, the material softens slightly with decreasing temperature. The elastic component of the complex dynamic viscosity, η", shows compounds 1 and 2 decreasing slightly in elasticity with increasing temperature, and then significantly increasing as vulcanization begins. After cure, the η" remains high and only decreases slightly, but is greater than prior to cure.

For compound A, the curves show the much lower uncured stiffness of the liquid polymer. The compound softens quickly as it approaches the melt point at which point it has a much lower uncured stiffness than compounds 1 or 2. The melt point of compound A is below the vulcanization temperature of the compound. Post cure, the compound has dynamic viscosity properties similar to conventional elastomers. Compound C also has a relatively low viscosity prior to cure, with a dynamic viscosity similar to conventional elastomers post cure.

While the above examples are specific to EPDM to achieve a high ethylene content for use with power transmission products, other liquid elastomers may be employed with the present invention. Suitable liquid elastomers include, but are not limited to, homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Other examples of synthetic rubbers include neoprene (polychloroprene), polybutadiene (including cis 1,4-polybutadiene), polyisoprene (including cis 1,4-polyisoprene), butyl rubber, including halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/ethylidene norbornene (ENB) terpolymers. Additional examples of rubbers which may be used include a carboxylated rubber such as carboxylated NBR, silicon-coupled and tin-coupled star-branched polymers. The preferred rubber or elastomers are EP(D)M, NBR, HNBR, SBR, XNBR, and CR.

Other exemplary compositions which may be used in the disclosed method are disclosed in greater detail in copending U.S. patent application Ser. No. 11/026,769, filed on Dec. 31, 2004, having a common inventor with the present application, and fully incorporated by reference herein.

To achieve thorough mixing of the compounds wherein a substantive portion of the cross-linkable material is a liquid elastomer and a solid material is being mixed therein, the solid material is fluxed into the mix. That is, the temperature of the mixture should be in the range of 10° F. (5.5° C.) above or below the melt point of the thermoplastic solid, the selected temperature of the mix is likely to be dependant upon the processing equipment. After the solid material is fluxed into the liquid elastomers, the material is subjected to a low shear mixing operation below the melt point of the thermoplastic solid. For solid materials not having a defined melt point, i.e. the material only softens as heated, conventional mixing methods using banburys, kneaders, and open mills may provide for sufficient thorough mixing of the compound.

In one sample mixing, the solid material, in the form of a powder, is added to a twin-screw compounding extruder. The powder melts as it travels through the extruder, and the liquid components are added into the extruder to be mixed into the melted thermoplastic components. Heat is applied to the extruder and the mixing within the screw extruder also generates heat to achieve thorough mixing of the components and fluxing in of the solid material. The non-productive mix is extruded, and the extrudant may be in the form of strings or pellets, the specific configuration dependent upon the machinery.

To transform the non-productive extruded material into a vulcanizable compound, the material is placed in an extruder, a mill or other mixer and curing agents and any other additional constituents, such as carbon black and/or silica, are added. The vulcanizable product is then prepared to coat any reinforcing means.

To achieve a high ethylene content elastomeric compound, as desired to reduce pilling of the power transmission products, for compounds comprising a relatively high amount of polyethylene, to achieve the necessary cross-linking of the material, peroxide is typically used in the cure system. For such a cure system, the amount of peroxide that is added is in the amount of 2-15 phcm, preferably 5-15, most preferably 5-10 phcm. If the peroxide amount is too great, the cross-linking will be too great and the material will be ebonized, and the reduced elongation of the material will be detrimental to the desired product characteristics. The amount of peroxide employed herein is relatively higher than conventional, bordering on ebonizing the material; however, the slight loss of elongation of the material results in a better wearing product. Those skilled in the art will recognize and appreciate that the cure systems, including those using sulfur and metal oxide, used is dependent upon the cross-linking components of the compound being prepared.

The coating with an elastomer comprising a liquid elastomer is applicable to any reinforcing means for elastomeric products. The reinforcement means may be individual cords, such as the cords 26, 40 of the belts 10, 30 or fabric layers such as the fabric 42 of belt 30. Thus, unless specifically mentioned otherwise, all future references to fabric include individual cords, whether provided with a nominal weft thread to maintain spacing of cords in a fabric-like manner or a single cord.

Figure 3:
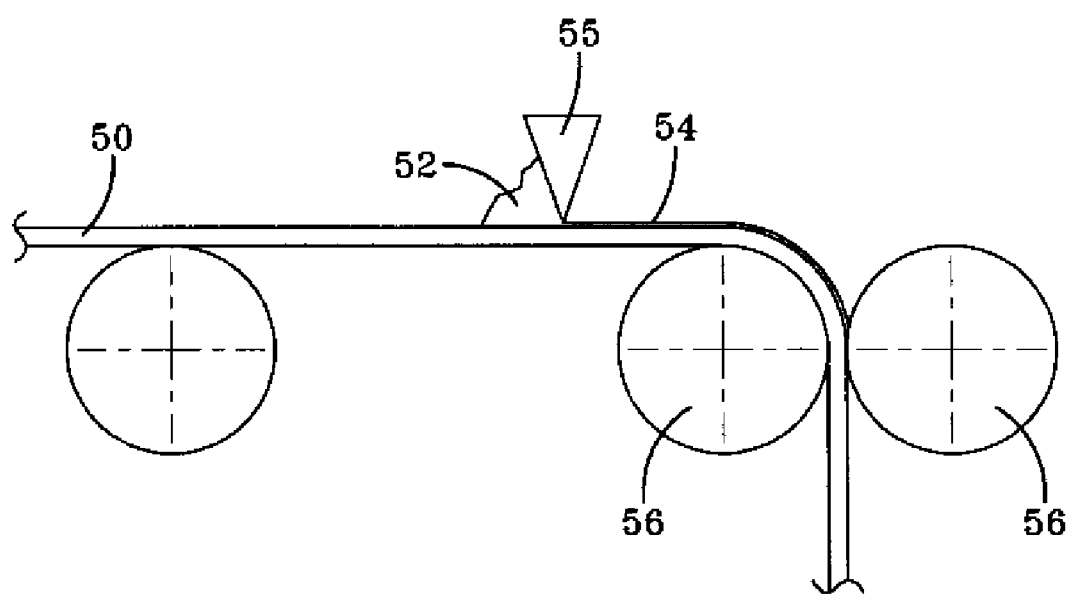
FIG. 3 is an exemplary method for applying liquid elastomer to a fabric.

One exemplary schematic of the coating method is illustrated in FIG. 3. After the fabric layer 50 is prepared by any conventional method such as, but not limited to, weaving, knitting, needling, or mat preparation, the fabric layer 50 is fed into an applicator. The liquid elastomer 52, which is solid or has a very high viscosity at room temperature and has been heated to a temperature below $T_F$ which reduces the viscosity, is applied to the fabric 50. The elastomer 52 is illustrated as being applied by passing the fabric 50 under a puddle of elastomer 52 and a blade 55 that removes excess elastomer and controls the thickness of the initial coating layer 54. Some of the elastomers according to the invention have Bingham or plastic flow properties, or complex viscosities, that prevent flow of the coating layer into the interstices of the fabric under the influence of gravity or capillary action. Sufficient pressure must be applied to the elastomer to create stress in excess of the yield stress of the Bingham or plastic flow. The magnitude and duration of the pressure must also create a shear stress sufficient to cause viscous flow into the particular geometry of the cavities in the fabric. The duration of the pressure applied by blade 55 may not cause the desired level of penetration for some elastomers. For such elastomers, the fabric may then pass between a pair of calender rolls 56 that apply pressure of higher magnitude or longer duration. The duration of the pressure applied by the blade or roll may be only a few milliseconds at economical processing speeds, so the applied pressure may be high. Alternatively, a lower pressure of longer duration can cause sufficient flow to fill the interstices of many useful fabrics. As an example, a pressure of 250 psi applied for 2 minutes to the coating layer 54 having a complex viscosity less than 1.3×10E6 cps provides the desired penetration of a typical envelope fabric 24 or tooth facing fabric 42.

Other penetration pressure applying methods include bagging and autoclaving the fabric 50 already treated with a coating layer 54. The pressure can also be applied when the elastomeric product comprising the treated fabric is vulcanized by keeping the vulcanization temperature below $T_F$ max for 2 to 5 minutes while the pressure is applied. It should be noted that if the material being coated with the elastomer is a cord, as opposed to a fabric, the pressure needed to fully encapsulate the cord may be different than that required for treating the fabric.

Alternatively, as the elastomer is closer to solid state at room temperature, the elastomer may be calendered into a thin layer, which is then pressed onto the fabric. This may be done in a batch process for finite length fabric pieces or in a continuous process for rolls of fabric, wherein the laminate is heated and pressure is applied thereto as the fabric travels along a predetermined path. Another method of application of the elastomer is the use of a sheet or film extruder that places the elastomer directly onto the fabric. Coating layer 54 applied by calendering or extrusion can also be bagged and autoclaved or pressed during vulcanization below $T_F$ max to achieve penetration of the fabric interstices. Coating layer 54 can also be applied by conventional spreading methods.

The viscosity of the liquid elastomer enables multiple layers of fabric to be impregnated at the same time. Multiple layers of identical fabric or layers of different fabric may be stacked up prior to impregnation.

After coating of the fabric 50, the fabric may be used immediately in a manufacturing process or cooled and stored. At room temperature, the liquid elastomer may have a solid state, permitting the fabric to be wound onto storage rolls.

The disclosed method provides for excellent rubber penetration into a fabric or into the filaments of a cord. To enhance the bonding of the rubber to the fabric or cord, the material may be pretreated with an adhesive, such as RFL (resorcinol formaldehyde latex), epoxy, isocyanate, or nylon adhesives to name a few. Such adhesives are well known in the art and may be applied by conventional methods.

The treatment method disclosed has the capability of yielding excellent penetration and/or encapsulation of filaments, yarns, and/or fabrics and of yielding a high level of green tack of the filament, yarn, and/or fabric. The greater tack level will facilitate building of the green product. In building belts in a grooved mold, the treated fabric may be preformed to the shape of the grooves in the mold, and will have a minimum level of adherence in the mold. In building on a circular building drum, the fabric layer will adhere to the adjacent layers. Due to better adherence of the layers during building and curing, the uniformity of the product will increase.

For belts of the type illustrated in FIG. 2, conventionally, in some belts, a plastic layer is applied to the outer surface of the fabric layer, as an outermost layer, to reduce the coefficient of friction and provide abrasion resistance. Such a plastic layer also prevents the tooth material, typically a high coefficient of friction material, from flowing to the outer surface of the belt. By treating the fabric in the method disclosed herein, the fabric is already coated and strikethrough of the tooth elastomer is pre-empted. Thus, the additional barrier layer is not required, reducing manufacturing complexity and costs.

While the method of treating fabric and manufacturing a product is described in the context of manufacturing power transmission products, the method may be applied in the manufacture of other products such as hoses, air spring sleeves, tires, conveyor belts, or other reinforced elastomeric articles.

What is claimed is:

1. A method for preparing a coated fabric which comprises (I) applying a vulcanizable elastomer composition to a layer of fabric, wherein the vulcanizable elastomer composition is made by a method comprising the steps of: (1) mixing a cross-linkable functionalized polyethylene with at least one cross-linkable liquid elastomer to form a non-reactive extrudant, wherein the mixing occurs at a temperature in the range of 10° F. above or below the melt point of the cross-linkable functionalized polyethylene, and wherein the non-reactive extrudant contains from 20 to 80 parts per hundred of the cross-linkable liquid elastomer, (2) extruding the non-reactive extrudant, and (3) mixing the extrudent with at least one curing agent, wherein the mixing is sufficient to form the vulcanizable elastomer, and wherein the vulcanizable elastomer has a complex dynamic viscosity of less than 5 McP (5,000 N*s/m$^2$) for at least 2 minutes at a maximum flow temperature; and (II) heating the layer of fabric having the vulcanizable elastomer applied thereto to a temperature which is within the range of 200° F. to 310° F. for at least 2 minutes to produce the coated fabric.

2. The method of claim 1 wherein the layer of fabric is a non-woven fabric.

3. The method of claim 1 wherein the layer of fabric is a woven fabric.

4. The method of claim 1 wherein the layer of fabric is a knitted fabric.

5. The method of claim 1 wherein the layer of fabric is a nylon fabric.

6. The method of claim 1 wherein the layer of fabric is a polyester fabric.

7. The method of claim 1 wherein the layer of fabric is an aramid fabric.

8. The method of claim 1 wherein the layer of fabric is a rayon fabric.

9. The method of claim 1 wherein the layer of fabric is a cotton fabric.

10. The method of claim 1 wherein the extrudant is formed into the shape of strings or pellets.

11. The method of claim 1 wherein the cross-linkable functionalized polyethylene is a cross-linkable oxidized polyethylene.

12. The method of claim 1 wherein the non-reactive extrudant contains from 25 to 60 parts per hundred of the cross-linkable liquid elastomer.

13. The method of claim 1 wherein the cross-linkable liquid elastomer is selected from the group consisting of polybutadiene rubber, nitrile rubber, hydrogenated nitrile rubber, styrene-butadiene rubber, neoprene rubber, butyl rubber, polyisoprene rubber, propylene rubber, carboxylated nitrile rubber, and EP(D)M rubber.

14. The method of claim 1 wherein the non-reactive extrudant contains from 30 to 55 parts per hundred of the cross-linkable liquid elastomer.

15. The method of claim 1 wherein the cross-linkable liquid elastomer is polybutadiene rubber.

16. The method of claim 1 wherein the cross-linkable liquid elastomer is styrene-butadiene rubber.

17. The method of claim 1 wherein the cross-linkable liquid elastomer is polyisoprene rubber.

18. The method of claim 1 wherein a non-reactive extrudant is further comprised of an ethylene-propylene rubber and an enthylene-propylene-diene rubber.

19. A method for preparing a coated cord which comprises (I) applying a vulcanizable elastomer composition to an uncoated cord, wherein the vulcanizable elastomer composition is made by a method comprising the steps of: (1) mixing a cross-linkable functionalized polyethylene with at least one cross-linkable liquid elastomer to form a non-reactive extrudant, wherein the mixing occurs at a temperature in the range of 10° F. above or below the melt point of the cross-linkable functionalized polyethylene, and wherein the non-reactive extrudant contains from 20 to 80 parts per hundred of the cross-linkable liquid elastomer, (2) extruding the non-reactive extrudant, and (3) mixing the extrudent with at least one curing agent, wherein the mixing is sufficient to form the vulcanizable elastomer, and wherein the vulcanizable elastomer has a complex dynamic viscosity of less than 5 McP (5,000 N*s/m$^2$) for at least 2 minutes at a maximum flow temperature; and (II) heating the cord having the vulcanizable elastomer applied thereto to a temperature which is within the range of 200° F. to 310° F. for at least 2 minutes to produce the coated cord.

20. The method of claim 19 wherein the cross-linkable liquid elastomer is selected from the group consisting of polybutadiene rubber, nitrile rubber, hydrogenated nitrile rubber, styrene-butadiene rubber, neoprene rubber, butyl rubber, polyisoprene rubber, propylene rubber, carboxylated nitrile rubber, and EP(D)M rubber; and wherein the non-reactive extrudant contains from 30 to 55 parts per hundred of the cross-linkable liquid elastomer.

* * * * *